United States Patent [19]
Takata et al.

[11] Patent Number: 5,273,685
[45] Date of Patent: Dec. 28, 1993

[54] THERMOPLASTIC RESIN COMPOSITION

[75] Inventors: Toshiaki Takata; Tadami Kinugawa; Hideo Otaki, all of Toyonaka, Japan

[73] Assignee: Mitsubishi Gas Chemical Co., Inc., Tokyo, Japan

[21] Appl. No.: 838,676

[22] Filed: Feb. 21, 1992

[30] Foreign Application Priority Data

Feb. 22, 1991 [JP] Japan .................. 3-48612
Feb. 22, 1991 [JP] Japan .................. 3-48613
Feb. 22, 1991 [JP] Japan .................. 3-48614

[51] Int. Cl.$^5$ .............. C08K 3/04; C08L 69/00; C08L 83/10
[52] U.S. Cl. ................. 252/511; 524/537; 524/588; 524/611; 528/29; 528/204; 525/67; 525/146; 525/148; 525/147; 525/464
[58] Field of Search ........... 252/511; 524/588, 611, 524/537; 528/29, 204; /

[56] References Cited

U.S. PATENT DOCUMENTS

| | | | |
|---|---|---|---|
| 3,419,634 | 12/1968 | Vaughn | 524/537 |
| 4,291,994 | 9/1981 | Smith | 428/412 |
| 4,599,262 | 7/1986 | Schulte | 428/412 |
| 4,876,033 | 10/1989 | Dziurla | 525/537 |
| 5,130,460 | 7/1992 | Kamei | 556/449 |

FOREIGN PATENT DOCUMENTS

| | | |
|---|---|---|
| 0105090 | 4/1984 | European Pat. Off. . |
| 0239764 | 10/1987 | European Pat. Off. . |
| 0384460 | 8/1990 | European Pat. Off. . |
| 55-135145 | 10/1980 | Japan . |
| 58-136652 | 8/1983 | Japan . |
| 61-43659 | 3/1986 | Japan . |

OTHER PUBLICATIONS

English translation of claim 1 of JP-A 58-136652.
English translation of claims 1 and 2 of JP-A 55-135145.
English translation of claims 1, 2, and 3 of JP-A 61-43659.

*Primary Examiner*—David J. Buttner
*Attorney, Agent, or Firm*—Sughrue, Mion, Zinn, Macpeak & Seas

[57] ABSTRACT

A thermoplastic resin composition comprising (a) 100 parts by weight of thermoplastic copolycarbonate comprising 0.1 to 50% by weight of structural unit of the following general formula (1) and 99.9 to 50% by weight of structural unit of the following general formula (2):

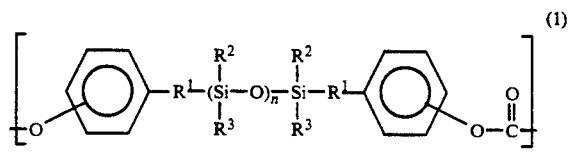

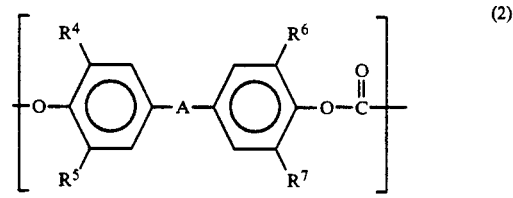

and (b) 0.1 to 30 parts by weight of electroconductive carbon black can produce a molding product having good mechanical properties and surface smoothness with good moldability.

6 Claims, No Drawings

THERMOPLASTIC RESIN COMPOSITION

BACKGROUND OF THE INVENTION

The present invention relates to a thermoplastic polycarbonate resin composition, and more particularly to an electroconductive resin composition capable of producing a molding product having good mechanical properties and surface smoothness with a good moldability, which comprises polycarbonate resin and electroconductive carbon black.

Electroconductive polymers comprising resin and electroconductive powder are used in wires, electrodes, electromagnetic wave shielding, antistatic application, etc. as substitutes for conventional metallic electroconductive materials, but also in cells, catalysts, recording display devices, sensors, etc, and their further development has been expected. However, compositions comprising polycarbonate resin and electroconductive carbon black have such drawbacks that the molding products have a poor appearance; the electroconductivity is low when carbon black is contained in a low mixing ratio, but can be improved in an increasing mixing ratio, though the strength of the molding products is lowered or the appearance of the molding products is deteriorated; and carbon black is classified at the extrusion, resulting in difficult extrusion or fluctuation in the electroconductivity due to the uneven distribution of carbon black.

SUMMARY OF THE INVENTION

An object of the present invention is to overcome the foregoing drawbacks of the prior art by using a specific polycarbonate resin. The present invention provides a thermoplastic resin composition which comprises (a) 100 parts by weight of thermoplastic copolycarbonate resin comprising 0.1 to 50% by weight of structural unit represented by the following general formula (1) and 99.1 to 50% by weight of structural unit represented by the following general formula (2):

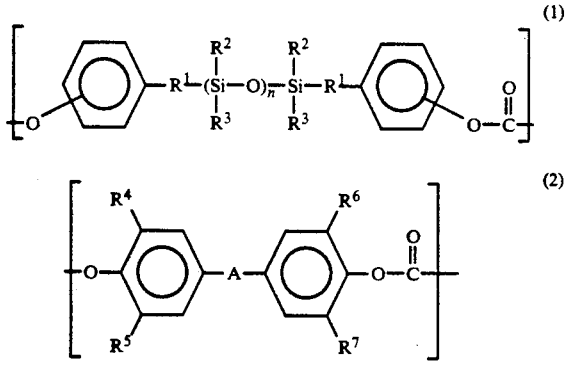

wherein $R^1$ is an alkylene group having 2 to 6 carbon atoms or an alkylidene group having 2 to 6 carbon atoms; $R^2$ and $R^3$ each are an alkyl group having 1 to 3 carbon atoms, a phenyl group or a substituted phenyl group; n is an integer of 1 to 200; A is a straight, branched or cyclic alkylidene group having 1 to 10 carbon atoms, an aryl-substituted alkylidene group, an arylenedialkylidene group, —O—, —S—, —CO—, or —SO$_2$—; $R^4$, $R^5$, $R^6$ and $R^7$ each are hydrogen, a halogen, an alkyl group having 1 to 4 carbon atoms or an alkenyl group having 1 to 4 carbon atoms, and (b) 0.1 to 30 parts by weight of electroconductive carbon black.

The present thermoplastic resin composition can further contain (c) thermoplastic polyester resin or (d) thermoplastic aromatic vinyl copolymer.

DETAILED DESCRIPTION OF THE INVENTION

The copolycarbonate resin (a) of the present invention can be prepared by copolymerization of dihydric phenols represented by the following general formulae (3) and (4):

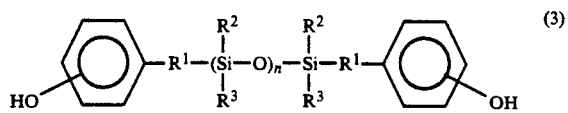

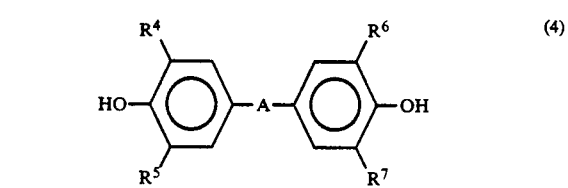

, wherein n, $R^1$, $R^2$, $R^3$, $R^4$, $R^5$, $R^6$, $R^7$ and A each have the same meanings as defined above with respect to the general formulae (1) and (2), with phosgen, carbonate ester or chloroformate, and has the structural units as defined by the foregoing general formulae (1) and (2). The copolycarbonate resin (a) has a viscosity average molecular weight of usually 10,000 to 50,000, preferably 20,000 to 40,000. Proportion of the structural unit represented by the general formula (1) in the copolycarbonate resin (a) is 0.1 to 50% by weight, preferably 0.1 to 30% by weight, and the repetition number n is in a range of 1 to 200, preferably 5 to 100 as an integer. $R^1$ in the general formula (1) is preferably an alkylene group having 2 to 6 carbon atoms, and includes, for example, ethylene, propylene, isopropylene, butylene, penthylene, hexylene, etc., among which —CH$_2$CH$_2$CH$_2$— and —CHR$^8$—CH$_2$— are preferable, where $R^8$ represents hydrogen or a methyl group, which is combined with the carbon atom on the side of benzene ring. $R^2$ and $R^3$ each are an alkyl group having 1 to 3 carbon atoms, a phenyl group or a substituted phenyl group, among which an alkyl group having 1 to 3 carbon atoms is preferable. The structural unit represented by the general formula (1) can be introduced into the copolycarbonate resin (a) by using the dihydric phenol having phenolic hydroxyl groups at both terminals, represented by the foregoing general formula (3) in the same manner as ordinary bisphenol is used.

The dihydric phenol represented by the general formula (3) and used as a raw material for the copolycarbonate resin (a) of the present invention is similar to the structural unit of general formula (1) as explained above. The dihydric phenol of the general formula (3) can be readily prepared by hydrosilylation reaction of a phenol having an olefinic unsaturated carbon-carbon bon, preferably vinylphenol, allylphenol or isopropenylphenol with the terminals of polysiloxane chain having a specific degree of polymerization (n).

Dihydric phenol compound represented by the general formula (4) for use in the preparation of the copolycarbonate resin (a) of the present invention includes, for example, bis(4-hydroxyphenyl) methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)cyclohexane, 2,2-bis(4-hydroxy-3,5-dimethylphenyl)propane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 1,1-bis(4-hydroxyphenyl)-1-phenylethane, bis(4-hydroxyphenyl)diphenylmethane, and 1,4-bis(2-(4-hydroxyphenyl)propyl)benzene, among which 2,2-bis(4-hydroxyphenyl)propane and 1,1-bis(4-hydroxyphenyl)cyclohexane are preferable from the viewpoint of heat stability.

A polymerization terminator or a molecular weight modifier is usually used and includes compounds having a monohydric phenolic hydroxyl group such as ordinary phenols, p-t-butylphenol, tribromophenol, long chain alkylphenols, aliphatic carboxylic acid chloride, aliphatic carboxylic acids, hydroxybenzoic acid alkylesters, hydroxyphenyl alkanoic acid esters and alkyletherphenols. 100 to 0.5 moles, preferably 50 to 2 moles of the polymerization terminator or molecular weight modifier is used per 100 moles of total of the dihydric phenols. It is also possible to use at least two of these compounds. It is also possible use 0.01 to 3% by mole, preferably 0.1 to 1.0% by mole, of a branching agent on the basis of total of the dihydric phenols. The branching agent includes, for example, fluoroglycin; polyhydroxy compounds such as 2,6-dimethyl-2,4,6-tris(4-hydroxyphenyl)heptene-3, 4,6-dimethyl-2,4,6-tris(4-hydroxyphenyl)heptene-2, 1,3,5-tris(2-hydroxyphenyl)benzene, 1,1,1-tris(4-hydroxyphenyl)ethane, 2,6-bis(2-hydroxy-5-methylbenzyl)-4-methylpheno, $\alpha,\alpha',\alpha''$-tris(4-hydroxyphenyl)-1,3,5-triisopropylbenzene, etc.; and 3,3-bis(4-hydroxyaryl)oxyindole (=isatin bisphenol), 5-chloroisatin, 5,7-dichloroisatin, 5-bromoisatin, etc.

Thermoplastic polyester resin (c) for use in the present invention is a polymer obtainable by reaction of an aromatic dicarboxylic acid or its diester with glycol or alkylene oxide in a well known manner, and includes, for example, polyethylene terephthalate and polytetramethylene terephthalate obtainable by reaction of terephthalic acid or dimethyl terephthalate as the main component of aromatic dicarboxylic acid with ethyleneglycol, butanediol, cyclohexanedimethanol, or ethylene oxide, copolymers of cyclohexanedimethanol, tetraphthalic acid and isophthalic acid, and copolymers of cyclohexanedimethanol, ethyleneglycol and terephthalic acid. Aromatic saturated polyester resin may be copolymers and may be a mixture of at least two thereof. The aromatic saturated polyester resin for use in the present invention has an intrinsic viscosity of usually at least 0.6, preferably 0.7 to 1.5, as measured at 30° C. in a solvent mixture of phenol and tetrachloroethylene in a ratio by weight of 6:4 of the former to the latter. Below 0.6, the strength is not satisfactory. Mixing ratio of thermoplastic polyester resin (c) to total of co-polycarbonate resin (a) and thermoplastic polyester resin (c) is 1 to 40% by weight, preferably 10 to 30% by weight. When the mixing ratio of thermoplastic polyester resin (c) is too high in the composition, the resulting molding product will become brittle, whereas in too low of a mixing ratio of (c) improvement of the resistances to chemicals and solvents is insufficient.

Thermoplastic aromatic vinyl copolymer (d) for use in the present invention is homopolymers or copolymers obtainable by homopolymerization or copolymerization of vinyl aromatic compounds such as styrene, $\alpha$-methylstyrene, vinyltoluene, halogenated styrene, vinylnaphthalene, etc., as an essential component, and includes, for example, high impact polystyrene (HI), acrylonitrile-styrene copolymer (AS), acrylonitrile-EPDM-styrene copolymer (AES), acrylonitrile-butadiene-styrene copolymer (ABS), acrylonitrile-butadiene-styrene-$\alpha$-methylstyrene copolymer (MUH resin), acrylonitrile-chlorinated polystyrene-styrene copolymer (ACS), methylmethacrylate-butadiene-styrene copolymer (MBS), etc. The thermoplastic aromatic vinyl copolymer (d) can further contain various rubber components such as styrene-butadiene rubber (SBR), butadiene rubber (BR), isoprene rubber (IR), ethylene-propylene copolymer rubber (EPM), ethylene-propylene diene copolymer rubber (EPDM), acrylonitrile-butadiene copolymer rubber (NBR), chloroprene rubber (CR), butyl rubber (IIR), urethane rubber (U), silicone rubber, hydrogenated nitrile rubber, fluorocarbon rubber (FKM), various thermoplastic elastomers (TPE) containing acrylic rubber, ethylene-acrylic rubber or core-shell polymer.

Mixing ratio of thermoplastic aromatic vinyl copolymer (d) to total of copolycarbonate resin (a) and the thermoplastic aromatic vinyl copolymer (d) is 1 to 50% by weight, preferably 10 to 30% by weight. When the mixing ratio of thermoplastic aromatic vinyl copolymer (d) is too high, the heat resistance of the resulting molding product will be deteriorated, whereas is too low a mixing ratio of (d) improvement is insufficient in the moldability.

Electroconductive carbon black (b) for use in the present invention includes, for example, superconductive furnace black, conductive furnace black, extra conductive furnace black, super abrasion furnace black, etc. It is preferable that the electroconductive carbon black has a specific surface area of at least 800 m$^2$/g and an oil absorption of 2 to 4 ml/g. Mixing ratio of electroconductive carbon black (b) is 0.1 to 30 parts by weight, preferably 2 to 20 parts by weight, to 100 parts by weight of thermoplastic copolycarbonate resin (a). Electroconductive carbon black (b) can be mixed with powder of thermoplastic copolycarbonate resin (a) in a well known manner, for example, by simple blending, and then melt-kneaded by batch-wise or continuous system.

The present thermoplastic resin composition can further contain various, well known additives so far used for polycarbonate resin, when desired, the additives include, for example, a reinforcing agent, a filler, a stabilizer, an ultraviolet-absorbing agent, an antistatic agent, a lubricant, a mold releasing agent, dye, pigment, a flame retardant and an impact resistance-improving elastomer. As a stabilizer, phosphorous acid or phosphite is particularly preferable. As a mold releasing agent, monohydric or polyhydric alcohol ester of saturated fatty acid can be mentioned and includes stearyl stearate, behenyl behenate, pentaerythritol tetrastearate, dipentaerythritol hexaoctoate, etc. as preferable ones. An organic or inorganic filler or reinforcing agent includes, for example, glass powder, glass beads, synthetic mica or fluorinated mica, zinc oxide, carbon fibers, glass fibers containing those having fiber diameters of not more than 2 $\mu$m, zinc oxide whiskers, stainless steel fibers, kevlar fibers, etc. Elastomers include, for example, MBS, MABS, MAS, etc. Furthermore, ordinary polycarbonate, polyester carbonate, polyarylate, etc. can be used together, when required.

According to the present invention, a polycarbonate resin composition capable of producing a molding product with good electroconductivity, appearance and mechanical properties by adding a relatively small amount of electroconductive carbon black thereto can be obtained. The present resin composition is suitable as injection molding material, and film or sheet material.

DESCRIPTION OF THE PREFERRED EMBODIMENTS

Preparation Example 1

3.8 kg of sodium hydroxide was dissolved in 45 l of water and then 7.2 kg of bisphenol A (BPA), 1.3 kg of polydimethylsiloxane having 2-(4-hydroxyphenyl) ethyl groups at both terminals and an average siloxane chain repetition number n=40 (X-22-165B, trademark of a product made by Shinetsu Kagaku K.K., Japan) and 8 g of hydrosulfite were dissolved therein, while keeping the solution at 20° C.

Then, 32 l of methylene chloride (MC) was added thereto, and 158 g of p-t-butylphenol (PTBP) was also added thereto with stirring. Then, 3.5 kg of phosgen was injected into the reaction mixture over 60 minutes. After the injection of phosgen, the reaction mixture was vigorously stirred and emulsified. After the emulsification, 8 g of triethylamine was added thereto, and the mixture was stirred for one hour to conduct polymerization.

The polymerization liquor was separated into an aqueous layer and an organic layer, and the organic layer was neutralized with phosphoric acid, and 35 l of isopropanol was added to the neutralized organic layer to precipitate polymers. The precipitates were recovered therefrom by filtration and dried, whereby polycarbonate resin PC-A in a white powdery state was obtained.

Preparation Example 2

Polycarbonate resin PC-B was prepared in the same manner as in Preparation Example 1, except that 1.3 kg of polydimethylsiloxane (X-22-165B) was replaced with 1.7 kg of polydimethylsiloxane having 2-(4-hydroxyphenyl)ethyl groups at both terminals and an average siloxane chain repetition number n=60 (X-22-165C, trademark of a product made by Shinetsu Kagaku K.K., Japan).

Preparation Example 3

Polycarbonate resin PC-C was prepared in the same manner as in Preparation Example 3, except that 1.3 kg of polydimethylsiloxane (X-22-165B) was replaced with 1.3 kg of polydimethylsiloxane having 3-(2-hydroxyphenyl)propyl groups at both terminals and an average siloxane chain repetition number n=40 (BY16-752, trademark of a product made by Toray-Dow Corning Silicone K.K., Japan).

Preparation Example 4

Polycarbonate resin PC-D was prepared in the same manner as in Preparation Example 1, except that 1.3 kg of polydimethylsiloxane (X-22-165B) was replaced with 3.0 kg of polydimethylsiloxane having 3-(2-hydroxyphenyl)propyl groups at both terminals and an average siloxane chain repetition number n=100 (BY 16-752E, trademark of a product made by Toray-Dow Corning Silicone K.K., Japan) and the amount of methylene chloride was changed to 38 l.

Preparation Example 5

Polycarbonate resin PC-E was prepared in the same manner as in Preparation Example 1, except that 1.3 kg of polydimethylsiloxane (X-22-165B) was replaced with 1.3 kg of polydimethylsiloxane having 2-(3-hydroxyphenyl) ethyl groups at both terminals and an average siloxane chain repetition number n=40 (X-22-2975, trademark of a product made by Shinetsu Kagaku K.K., Japan).

Preparation Example 6

Polycarbonate resin PC-F was prepared in the same manner as in Preparation Example 1, except that 7.2 kg of BPA was replaced with 3.6 kg of BPA and 3.2 kg of 4,4'-dihydroxydiphenylether (DHPE).

Preparation Example 7

Polycarbonate resin PC-G was prepared in the same manner as in Preparation Example 1, except that 3.2 kg of DHPE was replaced with 3.45 kg of 4,4'-dihydroxydiphenyl sulfide (TDP).

Example 1

94 parts by weight of polycarbonate resin PC-A ($Q=5.5\times 10^{-2}$ cm$^3$/sec) and 6 parts by weight of Ketjen black EC having a specific surface area of 800 m$^2$/g (product made by Ketjen Black International Co.) were pelletized through a vented biaxial extruder. The thus obtained pellets were compression molded into a sheet having a thickness of about 0.2 mm and the electroconductivity and repeated flexural fatigue strength of the sheet were measured. The pellets were also injection molded into a molding product having a thickness of 3.2 mm, and the electroconductivity and vibration flexural fatigue strength (completely reversed fatigue strength), and surface appearance (by visual inspection) of the molding product were evaluated. Furthermore, the flowability Q was measured. The results are shown in Table 1.

Example 2

Molding and tests were conducted in the same manner as in Example 1, except that 94 parts by weight of polycarbonate resin PC-B ($Q=4.1\times 10^{-2}$ cm$^3$/sec) was used in place of the polycarbonate resin PC-A. The results are shown in Table 1.

Example 3

Molding and tests were conducted in the same manner as in Example 1, except that 94 parts by weight of polycarbonate resin PC-C ($Q=5.2\times 10^{-2}$ cm$^3$/sec) was used in place of the polycarbonate resin PC-A. The results are shown in Table 1.

Example 4

Molding and tests were conducted in the same manner as in Example 1, except that 94 parts by weight of polycarbonate resin PC-D ($Q=2.5\times 10^{-2}$ cm$^3$/sec) was used in place of the polycarbonate resin PC-A. The results are shown in Table 1.

Example 5

Molding and tests were conducted in the same manner as in Example 1, except that 94 parts by weight of polycarbonate resin PC-E ($Q=4.9\times 10^{-2}$ cm$^3$/sec) was used in place of the polycarbonate resin PC-A. The results are shown in Table 1.

Example 6

Molding and tests were conducted in the same manner as in Example 1, except that 94 parts by weight of polycarbonate resin PC-F ($Q=5.2\times10^{-2}$ cm$^3$/sec) was used in place of the polycarbonate resin PC-A. The results are shown in Table 1.

Example 7

Molding and tests were conducted in the same manner as in Example 1, except that 94 parts by weight of polycarbonate resin PC-G ($Q=4.7\times10^{-2}$ cm$^3$/sec) was used in place of the polycarbonate resin PC-A. The results are shown in Table 1.

Comparative Example 1

Molding and tests were conducted in the same manner as in Example 1, except that 94 parts by weight of polycarbonate resin (Iupilon S-2000, trademark of a product made by Mitsubishi Gas Chemical Co., Inc., Japan; $Q=5.0\times10^{-2}$ cm$^3$/sec) was used in place of the polycarbonate resin PC-A. The results are shown in Table 1.

Comparative Example 2

Molding and tests were conducted in the same manner as in Comparative Example 1, except that the amount of Ketjen black was changed to 8 parts by weight. The results are shown in Table 1.

thermore, the flowability Q was measured. The results are shown in Table 2.

Example 9

Molding and tests were conducted in the same manner as in Example 8, except that 74 parts by weight of polycarbonate resin PC-C ($Q=5.2\times10^{-2}$ cm$^3$/sec) was used in place of the polycarbonate resin PC-A. The results are shown in Table 2.

Example 10

Molding and tests were conducted in the same manner as in Example 8, except that 74 parts by weight of polycarbonate resin PC-E ($Q=4.9\times10^{-2}$ cm$^3$/sec) was used in place of the polycarbonate resin PC-A. The results are shown in Table 2.

Example 11

Molding and tests were conducted in the same manner as in Example 8, except that 19 parts by weight of polyethylene terephthalate (RT-580, trademark of a product made by Japan Unipet K.K., Japan) was used in place of PBT. The results are shown in Table 2.

Example 12

Molding and tests were conducted in the same manner as in Example 8, except that 74 parts by weight of polycarbonate PC-F ($Q=5.2\times10^{-2}$ cm$^3$/sec) was used in place of the polycarbonate resin PC-A. The results are shown in Table 2.

TABLE 1

|  | 0.2 mm-thick film | | 3.2 mm-thick molding product | | | | |
| --- | --- | --- | --- | --- | --- | --- | --- |
|  | *1 Electro-conductivity Resistance ($\Omega$cm) | *2 Flexural fatigue break (repititions) | *1 Electro-conductivity Resistance ($\Omega$cm) | *3 Vibration flexural fatigue strength (kg/cm$^2$) | *4 Appearance | *5 Flowability $Q\times10^{-2}$ cm$^3$/sec | *6 Overall evaluation |
| Ex. 1 | $4\times10^3$ | 151 | $9\times10^6$ | 170 | ◯ | 3.0 | ◯ |
| Ex. 2 | $9\times10^4$ | 170 | $2\times10^6$ | 179 | ◯ | 1.9 | ◯ |
| Ex. 3 | $2\times10^3$ | 147 | $5\times10^7$ | 165 | ◯ | 3.2 | ◯ |
| Ex. 4 | $1\times10^2$ | 195 | $6\times10^6$ | 190 | ◯ | 1.2 | ◯ |
| Comp. Ex. 1 | $8\times10^7$ | 107 | $8\times10^{12}$ | 132 | X | 3.0 | X |
| Comp. Ex. 2 | $1\times10^2$ | 85 | $1\times10^5$ | 105 | X | 2.6 | X |
| Ex. 5 | $3\times10^3$ | 156 | $3\times10^6$ | 170 | ◯ | 3.2 | ◯ |
| Ex. 6 | $7\times10^3$ | 160 | $9\times10^7$ | 165 | ◯ | 3.5 | ◯ |
| Ex. 7 | $4\times10^3$ | 169 | $2\times10^6$ | 163 | ◯ | 3.3 | ◯ |

Remarks:
*1: According to JIS K 6911 procedure.
*2: MIT flexural fatigue break (repetitions) under a tension of 1 kg.
*3: According to ASTM D 671-63T (B) procedure at 10$^7$th repetition.
*4: Visual appearance inspection: "X" poor smoothness; "◯" smoothness.
*5: Measured by a koka-type flow tester at 280° C. and 160 kg/cm$^2$ through a nozzle (1 mm in diameter $\times$ 10 mm long).
*6: Overall evaluation: "◯" good "X" no good

Example 8

74 parts by weight of polycarbonate resin PC-A (flowability $Q=5.5\times10^{-2}$ cm$^3$/sec), 19 parts by weight of polybutylene terephthalate (Duranex 2002, trademark of a product made by Polyplastic K.K., Japan) and 7 parts by weight of Ketjen black EC having a specific surface of 800 m$^2$/g (product made by Ketjen Black International Co.) were pelletized through a vented biaxial extruder. The thus obtained pellets were injection molded into molding products, and the electroconductivity, vibration flexural fatigue strength (completely reversed fatigue strength), resistance to chemical and surface appearance (by visual inspection) of the resulting molding products were evaluated. Furthermore, the flowability Q was measured. The results are shown in Table 2.

Example 13

Molding and tests were conducted in the same manner as in Example 8, except that 74 parts by weight of polycarbonate resin PC-G ($Q=4.7\times10^{-2}$ cm$^3$/sec) was used in place of the polycarbonate resin PC-A. The results are shown in Table 2.

Comparative Example 3

Molding and tests were conducted in the same manner as in Example 8, except that 74 parts by weight of polycarbonate resin (Iupilon S-2000, trademark of a product made by Mitsubishi Gas Chemical Co., Inc., Japan; $Q=5.0\times10^{-2}$ cm$^3$/sec) was used in place of the polycarbonate resin PC-A. The results are shown in Table 2.

TABLE 2

|  | *1 Electro-conductivity Resistance ($\Omega$cm) | *2 Vibration flexural fatigue strength (kg/cm$^2$) | *3 Resistance to chemical | | *4 Appear-ance | *5 Flow-ability $Q \times 10^2$ cm$^3$/sec | *6 Overall evalua-tion |
|---|---|---|---|---|---|---|---|
|  |  |  | in air | in gasoline |  |  |  |
| Ex. 8 | $2 \times 10^6$ | 305 | 890 | 560 | ◯ | 6.0 | ◯ |
| Ex. 9 | $8 \times 10^6$ | 288 | 915 | 580 | ◯ | 6.3 | ◯ |
| Ex. 10 | $3 \times 10^6$ | 292 | 912 | 602 | ◯ | 5.9 | ◯ |
| Ex. 11 | $9 \times 10^7$ | 291 | 901 | 603 | ◯ | 6.1 | ◯ |
| Ex. 12 | $1 \times 10^5$ | 287 | 899 | 592 | ◯ | 5.5 | ◯ |
| Ex. 13 | $.5 \times 10^6$ | 293 | 907 | 599 | ◯ | 6.1 | ◯ |
| Comp. Ex. 3 | $3 \times 10^{11}$ | 212 | 903 | 600 | X | 6.2 | X |

Remarks:
*1: According to JIS K 6911 procedure.
*2: According to ASTM D 671-63 (B) procedure at 10$^5$th repetition.
*3: Flexural strength of a bar test piece (6 × ½ × ¼ in inch) according to ASTM D790 was measured at 25° C. after treatment at 75° C. for 24 hours.
*4: Visual appearance inspection: "X" poor smoothness; "◯" smoothness.
*5: Measured by a koka-type flow tester at 280° C. and 160 kg/cm$^2$ through a nozzle (1 mm in diameter × 10 mm long).
*6: Overall evaluation: "◯" good "X" no good

Example 14

73 parts by weight of polycarbonate resin PC-A ($Q=5.5 \times 10^{-2}$ cm$^3$/sec), 19 parts by weight of ABS resin (Toughlex 610, trademark of a product made by Mitsubishi Monsanto K.K., Japan), and 8 parts by weight of Ketjen Black EC having a specific surface area of 800 m$^2$/g (product made by Ketjen Black International Co.) were pelletized through a vented biaxial extruder. The thus obtained pellets were injection molded into molding products. The electroconductivity, impact strength, flowability and appearance of the molding products were measured. The results are shown in Table 3.

Example 15

Molding and tests were conducted in the same manner as in Example 14, except that 73 parts by weight of polycarbonate resin PC-C ($Q=5.2 \times 10^{-2}$ cm$^3$/sec) was used in place of the polycarbonate resin PC-A. The results are shown in Table 3.

Example 16

Molding and tests were conducted in the same manner as in Example 14, except that 73 parts by weight of polycarbonate resin PC-E ($Q=4.9 \times 10^{-2}$ cm$^3$/sec) was used in place of the polycarbonate resin PC-A. The results are shown in Table 3.

Example 17

Molding and tests were conducted in the same manner as in Example 14, except that 19 parts by weight of acrylonitrile-styrene copolymer (AS resin Sebian N, trademark of a product made by Daicel Chemical Industries K.K., Japan) was used in place of ABS of Example 14. The results are shown in Table 3.

Example 18

Molding and tests were conducted in the same manner as in Example, 14, except that the amount of polycarbonate resin PC-A was changed from 73 parts by weight to 87 parts by weight, and 19 parts by weight of ABS resin was replaced with 5 parts by weight of methyl methacrylate-styrene thermoplastic resin (Methablen E901, trademark of a product made by Mitsubishi Rayon K.K., Japan). The results are shown in Table 3.

Example 19

Molding and tests were conducted in the same manner as in Example 14, except that 73 parts by weight of polycarbonate resin PC-F ($Q=5.2 \times 10^{-2}$ cm$^3$/sec) was used in place of the polycarbonate resin PC-A. The results are shown in Table 3.

Example 20

Molding and tests were conducted in the same manner as in Example 14, except 73 parts by weight of polycarbonate resin PC-G ($Q=4.7 \times 10^{-2}$ cm$^3$/sec) was used in place of the polycarbonate resin PC-A. The results are shown in Table 3.

Comparative Example 4

Molding and tests were conducted in the same manner as in Example 14, except that 73 parts by weight of polycarbonate resin (Iupilon S-2000, trademark of a product made by Mitsubishi Gas Chemical Co., Inc. Japan; $Q=5.0 \times 10^{-2}$ cm$^3$/sec) was used in place of the polycarbonate resin PC-A. The results are shown in Table 3.

TABLE 3

|  | *1 Electro-conductivity Resistance ($\Omega$cm) | *2 Izod impact strength (kgcm/cm) | *3 Flow-ability $Q \times 10^{-2}$ cm$^3$/sec | *4 Appear-ance | *5 Overall evalua-tion |
|---|---|---|---|---|---|
| Ex. 14 | $1 \times 10^4$ | 49 | 19.2 | ◯ | ◯ |
| Ex. 15 | $9 \times 10^5$ | 48 | 20.0 | ◯ | ◯ |
| Ex. 16 | $3 \times 10^4$ | 45 | 19.6 | ◯ | ◯ |
| Ex. 17 | $2 \times 10^4$ | 52 | 17.4 | ◯ | ◯ |
| Ex. 18 | $7 \times 10^4$ | 59 | 10.0 | ◯ | ◯ |
| Ex. 19 | $3 \times 10^4$ | 45 | 18.3 | ◯ | ◯ |

TABLE 3-continued

|  | *1 Electro- conductivity Resistance (Ωcm) | *2 Izod impact strength (kgcm/cm) | *3 Flow- ability Q × 10⁻² cm³/sec | *4 Appear- ance | *5 Overall evalua- tion |
| --- | --- | --- | --- | --- | --- |
| Ex. 20 | $5 \times 10^4$ | 48 | 19.7 | ○ | ○ |
| Comp. Ex. 4 | $7 \times 10^5$ | 42 | 19.0 | X | X |

Remarks:
*1: According to JIS K 6911 procedure.
*2: According to ASTM D 256 procedure.
*3: Measured by a koka-type flow tester at 280° C. and 160 kg/cm² through a nozzle (1 mm in diameter × 10 mm long).
*4: Visual appearance inspection: "X" smoothness and "○" smoothness.
*5: Overall evaluation: "○" good "X" no good

What is claimed is:

1. A thermoplastic resin composition which comprises 100 parts by weight of (a) a thermoplastic copolycarbonate resin comprising 0.1 to 30% by weight of a structural unit represented by the following general formula (1) and 99.9% to 70% by weight of structural unit represented by the following general formula (2):

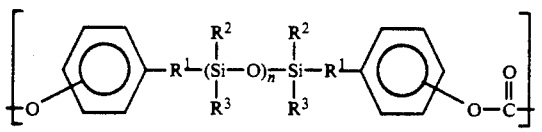

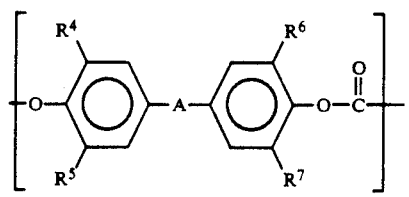

wherein $R^1$ is an alkylene group having 2 to 6 carbon atoms or an alkylidene group having 2 to 6 carbon atoms; $R^2$ and $R^3$ each is an alkyl group having 1 to 3 carbon atoms, a phenyl group or a substituted phenyl group, n is an integer of 1 to 200; A is a straight, branched or cyclic alkylidene group having 1 to 10 carbon atoms, an aryl-substituted alkylidene group, an arylenedialkylidene group, —O—, —S—, —CO—, or —SO₂—; $R^4$, $R^5$, $R^6$ and $R^7$ each are hydrogen, a halogen, an alkyl group having 1 to 4 carbon atoms or an alkenyl group having 1 to 4 carbon atoms, and (b) 0.1 to 20 parts by weight of electroconductive carbon black.

2. A thermoplastic resin composition according to claim 1, wherein $R^1$ is an alkylene group having 2 to 6 carbon atoms and $R^2$ and $R^3$ each are an alkyl group having 1 to 3 carbon atoms.

3. A thermoplastic resin composition according to claim 1, wherein the structural unit of the general formula (2) is derived from 2,2-bis(4-hydroxyphenyl)-propane and 1,1-bis(4-hydroxyphenyl) cyclohexane.

4. A thermoplastic resin composition according to claim 1, wherein the structural unit of the general formula (2) is derived from at least two kinds of bisphenols.

5. A thermoplastic resin composition according to claim 4, wherein the structural unit of the general formula (2) is derived from a combination of 2,2-bis(4-hydroxyphenyl)propane and bis(4-hydroxyphenyl)ether or bis 4-hydroxyphenyl)sulfide.

6. A thermoplastic resin composition according to claim 1, wherein the thermoplastic copolycarbonate resin (a) has a viscosity average molecular weight of 10,000 to 50,000.

* * * * *